H. C. COHEN.
RESILIENT TIRE.
APPLICATION FILED APR. 3, 1914.
1,133,102.
Patented Mar. 23, 1915.
2 SHEETS—SHEET 1.
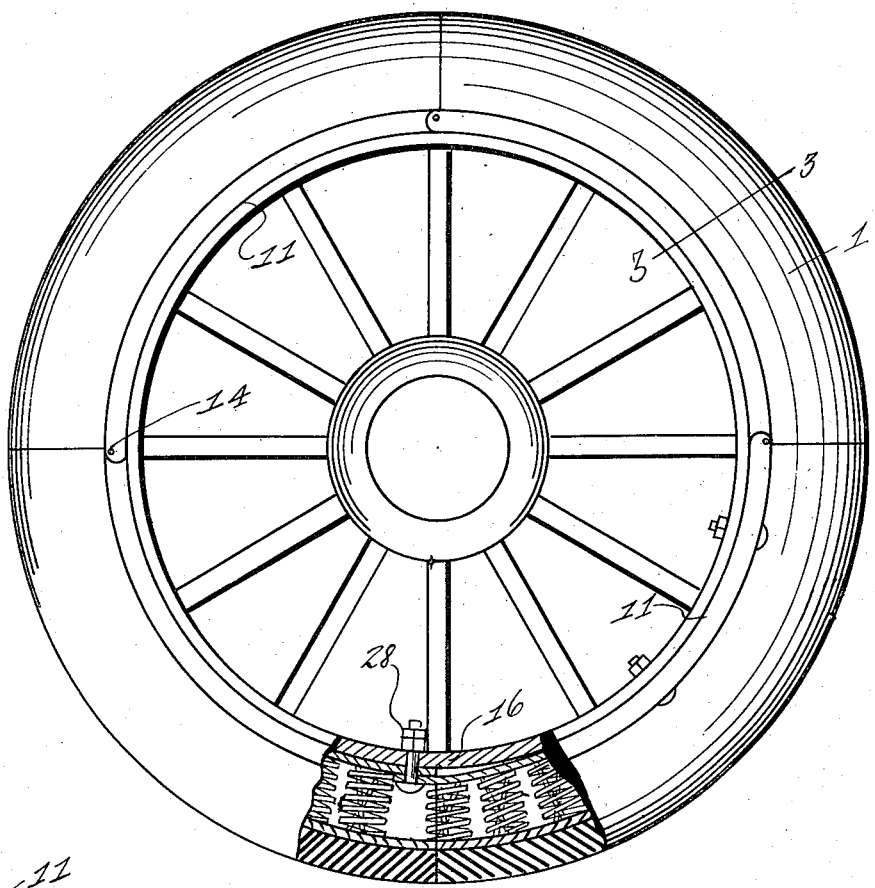
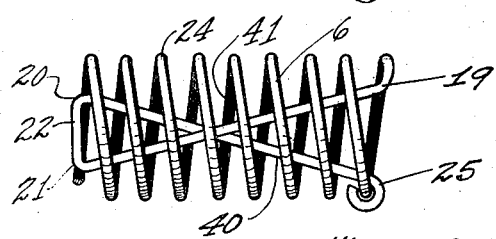
Inventor
Hiram C. Cohen.

H. C. COHEN.
RESILIENT TIRE.
APPLICATION FILED APR. 3, 1914.
1,133,102.
Patented Mar. 23, 1915.
2 SHEETS—SHEET 2.
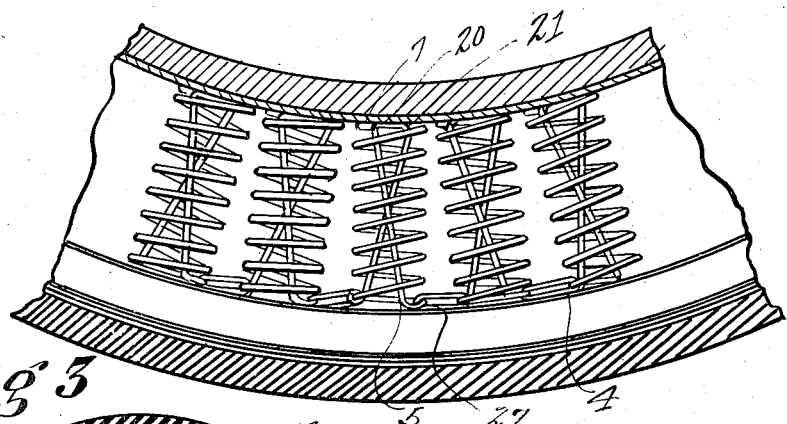
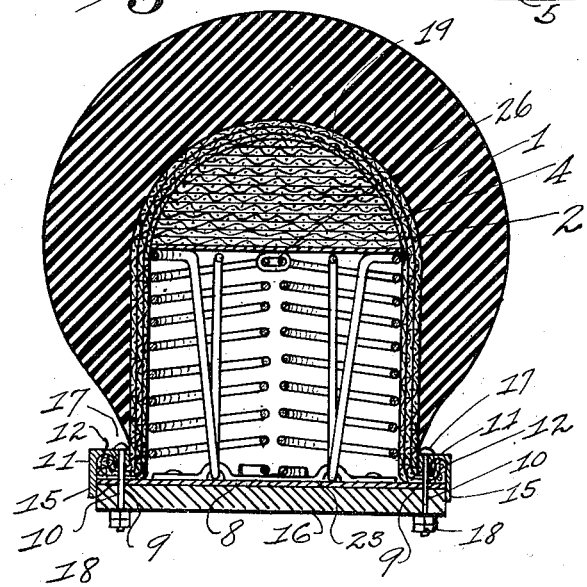
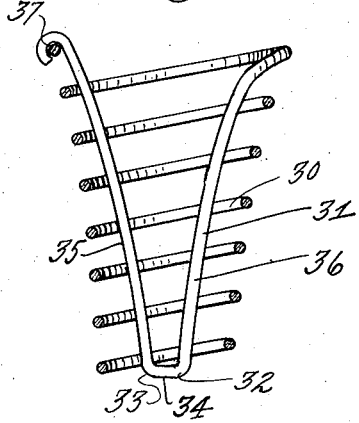
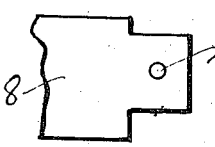
Inventor
Hiram C. Cohen.

UNITED STATES PATENT OFFICE.

HIRAM C. COHEN, OF SYRACUSE, NEW YORK.

RESILIENT TIRE.

1,133,102.  Specification of Letters Patent.  Patented Mar. 23, 1915.

Application filed April 3, 1914. Serial No. 829,260.

*To all whom it may concern:*

Be it known that I, HIRAM C. COHEN, a citizen of the United States, residing at Syracuse, in the county of Onondaga and State of New York, have invented certain new and useful Improvements in Resilient Tires; and I do hereby declare the following to be a full, clear, and exact description of the invention, such as will enable others skilled in the art to which it appertains to make and use the same.

This invention relates to resilient vehicle tires and more particularly to a tire applicable for use upon automobiles or similar vehicles.

The primary object of this invention is the provision of a resilient tire which has a plurality of shock absorbing resilient members mounted interiorly thereof for peripheral circumferential mounting upon a wheel to absorb the various shocks occasioned by the travel of the vehicle, upon which wheels equipped with the improved tire, are mounted.

Another object of this invention is the provision of resilient means for limiting the movement of the shock absorbing resilient member, for limiting the shock absorbing properties of the tire and preventing the breaking or disruption of the shock absorbing resilient members.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a side elevation of a vehicle wheel showing the improved tire attached thereto, and showing a part of the tire broken away. Fig. 2 is an enlarged fragmentary sectional view of the tire. Fig. 3 is a cross sectional view on the line 3—3 of Fig. 1. Fig. 4 is a side elevation of the resilient shock absorbing means and the resilient means for limiting the movement thereof. Fig. 5 is a detail fragmentary view of the manner and means of attaching the tire to a vehicle wheel, and Fig. 6 is a detail sectional view of a modified form of the shock absorbing member.

Referring more particularly to the drawings, 1 designates the outer casing or shoe of the tire which is constructed in the ordinary manner, having an outer casing of rubber or similar resilient material and being provided with an internal annular recess 2. The recess 2 formed within the shoe 1 of the tire has the upper or outer arcuate portion thereof filled with any suitable type of filling material as is indicated at 3 and a flat sheet 4 of fiber or other similar springy or resilient material positioned within the tire and forming a roof for the opening or recess formed in the shoe 1. The sheet 4 extends completely about the circumference of the tire and forms an abutment for the ends 5 of the coil springs 6. The springs 6 are positioned in pairs laterally of the tire and in alining rows circumferentially about the interior of the tire.

The ends 7 of the springs which are positioned toward the axis of the tire abut a plate 8, which plate is constructed of thin sheet metal or the like and has its marginal edges provided with a plurality of spaced openings 9 for the reception of bolts 10. The bolts 10 extend radially through the plate 8 and through the arcuate metallic binding strips 11. The arcuate binding strips 11 are provided with cut-out portions 12 formed in their under surface, which cut-out portions receive the marginal edges of the shoe 1, as is clearly shown in Fig. 3 of the drawings.

The binding strips 11 are hingedly connected one, to the one next thereto as is clearly shown at 14, and they extend circumferentially about the inner side or edge of the tire and have their sides 15 in facial abutment with the sides of the wheel rim or felly 16 so as to prevent the passage of sand or foreign substance between the binding plates and into the interior of the shoe 1.

In mounting the shoe 1 upon the rim or felly of a wheel, the marginal edges of the shoe are inserted within the cut-out portions 12 and the various sections of the binding strips 11 are positioned about the felly and moved, through the medium of their hinged connections so that they will snugly and firmly fit the edges of the felly, after which the bolts 10 are inserted through openings 17 which openings are spaced about the binding strips for alinement with the openings 9, and the bolts are also inserted through the metallic plate 8 and the felly of the wheel and are securely held in place by lock-nuts 18, securely binding the binding strips 11 in engagement with the felly 16 and holding the tire 1 upon the wheel.

The springs 6 have the wire of which they are formed bent downwardly as at 19, and extending diagonally across the interior of the spring, being bent at 20 and 21 to form a straight portion 22, which straight portion abuts the inner surface of the plate 8 and is securely held attached thereto by binding strips 23, which strips are secured to the plate 8 by any suitable type of fastening means and are bent intermediate their ends to form engaging and receiving portions for the straight lengths 22 of the wires 24 of which the springs 6 are formed. The wire 24 extends upwardly diagonally across the interior of the springs 6 from the point 20 and has its terminal end coiled about the uppermost rung of the coil springs 6 as is shown at 25.

The lateral pairs of the springs 6 are connected by links 26, which links are secured to the meeting portions of the uppermost convolution of the springs as is clearly shown in Fig. 3, and the links tend to hold the spring 6 in proper position and prevent independent movement of one spring with respect to the other. The springs 6 are also connected in circumferential alining rows by links 27 which links are also connected to the uppermost convolution of the springs and prevent the displacement of the springs circumferentially with respect to each other. The links 26 and 27 also tend to equalize or equally distribute among the coil springs the shock or compression occasioned by the contact of the tire with a rock or rough place upon the road, thereby increasing the longevity of the springs and eliminating the possibility of one spring becoming worn or broken prior to another.

The strip 8 has its terminal ends overlapping and secured to each other and to the felly 16 of the wheel by bolts 28. One terminal end of the plate 8 is cut away as is shown in Fig. 7 of the drawings, so as to permit of the overlapping of the terminal ends without interference to the sides of the shoe 1.

In Fig. 6 of the drawings a modified form of the shock absorbing means of the tire is shown, and in this view a helical spring 30 is shown which has the end 31 of the wire of which the spring is formed bent downwardly and extending the full length of the spring being bent at 32 and 33 to form a straight portion 34 and an arm 35, which arm is disposed directly opposite the arm 36 formed by the original bending of the wire and has its terminal end coiled about the uppermost rung of the helical spring as is shown at 37. The arms 35 and 36 curve inwardly toward the central axis of the helical spring, so that upon the administration of compressing force thereupon the springs may bend or curve substantially the entire diameter of the helical springs before their movement is limited or retarded by the coils of the spring.

If it is desired, it is to be understood that a single circumferential roll of springs may be positioned interiorly of the shoe 1 of a tire without departing from the spirit of this invention.

The compressing force of the contact of the shoe 1 with a rock or rough place upon a highway is borne by the arms 40 and 41, which arms extend diagonally across the interior of the spring 6, as has been heretofore described and intersect substantially equidistant of the ends of the springs and the convolutions of the springs form walls or means for retarding the bending or curving of the arms 40 and 41, after which the shock is transmitted to the springs (not shown) or shock absorbers (not shown) of the vehicle upon which the improved tires are mounted. When the modified form of shock absorbing means as illustrated in Fig. 6 of the drawings, is used the arcuate arms 35 and 36 serve purposes identical with the diagonal arms 40 and 41 and the coiled walls of the springs tend to decrease the liability of breaking of the arms, thereby increasing their longevity, as well as limiting the bending and shock absorbing properties thereof.

From the foregoing description taken in connection with the accompanying drawings the advantages of the construction and of the method of operation of the improved resilient tire will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a resilient tire, a plurality of substantially straight resilient shock absorbing arms arranged in pairs about the circumference of a tire, one arm of each of said pairs being extended and curved to form resilient convolutions which are coiled about said arms for forming housings therefor, and one end of the other arms of each of said pairs of arms being attached to the uppermost of said convolutions.

2. In a resilient tire, a plurality of substantially straight resilient shock absorbing arms arranged in pairs about the circumference of a tire, bases connecting the corresponding ends of the arms forming each of said pairs of arms, one of said arms of which each pair is formed being extended and curved to form resilient convolutions which are coiled about said arms for forming housings therefor, the other of said arms being attached to the uppermost of said convolutions.

3. In a resilient tire, a plurality of substantially straight resilient shock absorbing arms having their corresponding ends connected by a base, said arms extending upwardly from said base and crossing each other intermediate their ends, one of said arms having one end thereof extended and curved to form resilient convolutions which are coiled about said arms for limiting the shock absorbing resilient movement of said substantially straight arms.

4. The combination with a wheel having a felly, of a resilient tire having a plurality of substantially straight resilient shock absorbing arms mounted therein, said arms being arranged in pairs about the circumference of said tire, lateral bases connecting the corresponding ends of said arms, said bases being supported by said felly, said arms extending upwardly from said bases and being crossed intermediate their ends, one of said arms having one end thereof extended and curved to form resilient convolutions which are coiled about said arms for limiting the resilient shock absorbing movement of said arms, the other of said arms being connected to the uppermost of said resilient convolutions and bearing against the inner surface of the outer portion of said tire.

In testimony whereof I affix my signature in presence of two witnesses.

HIRAM C. COHEN.

Witnesses:
ROBERT MEYER,
CHAS. M. BIRCKHEAD.